United States Patent Office 3,661,904
Patented May 9, 1972

---

3,661,904
2-ALKYL-4,5-DICHLORO-AMINOPYRIDAZONES-3 AND PREPARATION THEREOF
Masao Iizuki, Kanagawa Prefecture, Norio Igari, Tokyo, and Shinya Ito, Kyoto, Japan, assignors to Hodogaya Kagaku Kogyo Kabushiki Kaisha, Tokyo, Japan
No Drawing. Filed May 7, 1970, Ser. No. 35,567
Int. Cl. C07d 51/04
U.S. Cl. 260—250       7 Claims

ABSTRACT OF THE DISCLOSURE 2-alkyl-4,5-dichloro - 6 - aminopyridazones-3 of the formula:

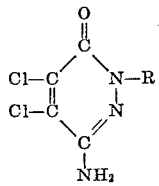

wherein R is an alkyl group having 1 to 4 carbon atoms are intermediates for the production of monoazo dyestuffs having an affinity to metal-containing polyolefins and polyesters. These compounds are prepared by nitrating the corresponding 2-alkyl-4,5-dichloro-pyridazones-3 and reducing the 6-nitro group of the intermediate to an amino group.

DETAILED DESCRIPTION

The present invention relates to novel 2-alkyl-4,5-dichloro-6-aminopyridazones-3 and the production thereof. It is an object of the present invention to provide said novel 2-alkyl-4,5-dichloro-6-aminopyridazones-3. It is another object of the present invention to provide a process for the production of said novel 2-alkyl-4,5-dichloro-6-aminopyridazones-3. It has been found that these aminopyridazone compounds serve as valuable starting material for the production of many useful compounds derived therefrom. In particular, they are starting materials for the azo dyestuffs disclosed and claimed in our application Ser. No. 565,079, now U.S. Pat. No. 3,496,160.

According to the present invention, the novel 2-alkyl-4,5-dichloro-6-aminopyridazones-3 represented by the formula:

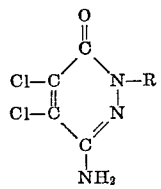     (I)

wherein R is an alkyl group of 1 to 4 carbon atoms can be prepared by nitrating the 2-alkyl-4,5-dichloro-pyridazones-3 represented by the formula:

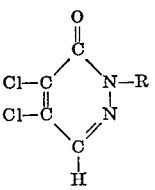     (II)

wherein R is as defined above to form 2-alkyl-4,5-dichloro-6-nitropyridazones-3 represented by the formula:

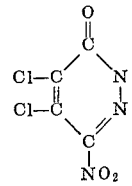     (III)

wherein R is as defined above, and reducing the nitro group of the latter compounds (III) to the 2-alkyl-4,5-dichloro-6-aminopyridazones-3 of the above-mentioned Formula I.

The 2-alkyl-4,5-dichloropyridazones-3 used as the starting materials in the first step of the process of the present invention are readily prepared either by reacting mucochloric acid with an alkylhydrazine such as methylhydrazine or by treating 4,5-dichloropyridazone-3 with an alkylating agent such as, for example, dimethyl sulfate.

The 2-alkyl-4,5-dichloro-6-nitropyridazones-3 of the Formula III, on the other hand, may be prepared with ease by treating the 2-alkyl-4,5-dichloropyridazones-3 in a concentrated sulfuric acid with nitric acid. A 90–100% sulfuric acid is preferably employed for the purposes of dissolving said 2-alkyl-4,5-dichloropyridazones-3 and a good result is obtained when a 90–98% sulfuric acid is employed. A suitable amount of the sulfuric acid to be employed is 3–5 times the weight of the material to be nitrated.

It has also been observed that the use of a fuming nitric acid having a specific gravity of 1.5 in an amount of 2–3 times the theoretical amount is favorable for the purpose of nitrating the material. The nitration can be accomplished at nearly the theoretical yield when it is carried out at a temperature above 80° C., preferably at 90–95° C. and for 3–6 hours.

Since the resulting 2-alkyl-4,5-dichloro-6-nitropyridazones-3 show significant solubility in water and also in dilute sulfuric acid, it is desirable to recover the same from the reaction mixture when the reaction has been performed, by pouring it into as small an amount of ice water as possible.

The 2-alkyl-4,5-dichloro-6-nitropyridazones-3 thus obtained may be converted to the 2-alkyl-4,5-dichloro-6-amino-pyridazones-3 by one of the conventional methods employed in reducing a nitro group to an amino group such as, for example, by a catalytic reduction using a catalyst such as Raney nickel; by the so-called Bechamp method in which a metal such as, for example, iron, zinc or tin is used along with hydrochloric acid; and by means of an alkaline reducing agent such as sodium sulfide and hydrosulfite. Because the compounds of both the aforementioned Formulae I and III contain active chlorine atoms, the use of severe reaction conditions such as an extreme pH value of the reaction medium, an excessively high reaction temperature and/or pressure and a long reaction time should be avoided.

All the specified compounds obtained by the process of the present invention are new substances and are useful as intermediates suitable for the production of dyestuffs.

The following examples, in which all parts are by weight, will serve to further illustrate the present invention.

EXAMPLE I 9.0 grams (0.05 mol.) of 2-methyl-4,5-dichloro-pyridazone-3 melting at 84–86° C. were dissolved in 34.5 grams of 92.4% sulfuric acid. At ordinary temperature, about 20° C., there were added drop-by-drop to the solution 10.2 grams (0.15 mol.) of 94% fuming nitric acid (specific gravity of 1.5). The reaction mixture was then heated gradually to 90–95° C., and kept at that temperature for 6 hours.

The reaction mixture was poured onto 100 grams of ice water. The crystalline mass which separated out was recovered by filtration. The filter cake thus obtained was introduced to 100 grams of water, stirred thoroughly, neutralized with ammonium acetate and again filtered off. The filter cake was washed with cold water and dried at a temperature of 70° C. There were obtained 10.0 grams of pale yellow crystals of 2-methyl-4,5-dichloro-6-nitropyridazone-3 melting at 99–100° C., which yield amounts to 97.5% of theory. As is evident from the data set forth below, elemental analysis of the product was in accord with the calculated values.

As $C_5H_3O_3N_3Cl_2$, molecular weight: 224.0. Calculated (percent): C, 26.81; H, 1.35; N, 18.76; Cl, 31.65. Found (percent): C, 26.83; H, 1.50; N, 18.78; Cl, 31.36.

A reducing mixture was prepared by introducing 9.8 grams of pulverized iron and 0.5 gram of a 36% hydrochloric acid into an aqueous solution of ethyl alcohol consisting of 112 grams of ethyl alcohol and 135 grams of water, and the whole was warmed to a temperature of 78–82° C. To the mixture were added portionwise 11.5 grams (0.05 mol.) of the above-obtained 2-methyl-4,5-dichloro - 6 - nitropyridazone - 3 over half an hour, and the whole was kept for one hour at that temperature. At the temperature of 70° C., the reaction mixture was made weakly alkaline by adding a small amount of sodium carbonate and filtered hot. The filtrate was neutralized with acetic acid and the ethyl alcohol was stripped therefrom by distillation in a still. When the interior temperature of the still reached 980 C., the residual solution was allowed to cool. A colorless crystalline mass separated out was recovered by filtration, washed with cold water and dried at a temperature of 60° C. There were obtained 8.9 grams of 2 - methyl - 4,5 - dichloro - 6 - aminopyridazone-3 having a melting point of 191.5–193° C., which is 92% of theory.

Elemental analysis of the product, as set forth below, was in accord with the calculated values:

As $C_5H_5ON_3Cl_2$, molecular weight: 194.0. Calculated (percent): C, 30.93; H, 2.58; N, 21.65; Cl, 36.60. Found (percent): C, 30.62; H, 2.50; N, 22.00; Cl, 36.53.

EXAMPLE II 11.5 grams of 2-methyl-4,5-dichloro-6-nitropyridazone-3 obtained in the manner disclosed in the first paragraph of the preceding example were dissolved in 300 grams of ethyl alcohol. To the solution at 30° C. were added portionwise 44 grams of sodium hydrosulfite and the reaction mixture was maintained at that temperature until the yellow coloration of the solution disappeared, which indicates the occurrence of the reducing reaction. When the reaction was completed, the reaction mixture was neutralized with acetic acid and filtered. On concentration of the filtrate under reduced pressure, there were obtained 9.3 grams of 2-methyl-4,5-dichloro-6-amino)-pyridazone-3 having a melting point of 192–193° C., which amounts to a 96% yield.

EXAMPLE III 9.7 grams (0.05 mol) of 2-ethyl-4,5-dichloropyridazone-3 melting at 49–51° C., were dissolved in 32.6 grams of 98% sulfuric acid.

To the solution were added drop-by-drop at ordinary temperature, i.e., about 20° C., 8.2 grams (0.12 mol.) of 94% fuming nitric acid having a specific gravity of 1.5. The whole was then slowly heated to 90–95° C., and was subjected to reaction by maintaining it for 6 hours at that temperature. When the reaction was completed, the reaction mixture at room temperature was poured onto 100 grams of ice water. The crystalline mass was separated out and filtered. The filter cake was introduced to 80 grams of water, stirred thoroughly, neutralized with ammonium acetate and then filtered off. The filter cake was washed with cold water and dried at 60° C. There were obtained 11.5 grams of crystals of pale yellow 2-ethyl-4,5-dichloro-6-nitropyridazone-3 having a melting point of 87.5–89.5° C., which amounts to 96.5% of theory. An elemental analysis was in accord with the theoretical values.

As $C_6H_5O_3N_3Cl_2$, molecular weight: 238.0. Calculated (percent): C, 30.25; H, 2.10; N, 17.65; Cl, 29.83. Found (percent): C, 31.00; H, 2.01; N, 17.64; Cl, 29.92.

11.9 grams (0.05 mol.) of the 2-ethyl-4,5-dichloro-6-nitropyridazone-3 were charged in a closed vessel provided with a hydrogen-inlet tube. There was further added 200 grams of methyl alcohol in which 10 grams of an activated Raney-nickel had been dispersed. At a temperature of 30–35° C., there was introduced gaseous hydrogen through the hydrogen-inlet tube during which the stirring was continued until absorption of the gaseous hydrogen ceased. Thereafter, the Raney nickel remaining in the reaction mixture was removed by filtration and the filtrate was concentrated under reduced pressure. 9.5 grams of colorless crystals of 2-ethyl-4,5-dichloro-6-aminopyridazone-3 melting at 130–131° C., were thus recovered. The yield corresponds to 91.3% of theory.

As set forth below, an elemental analysis of the product was in accord with calculated values.

As $C_6H_7ON_3Cl_2$, molecular weight: 208.0. Calculated (percent): C, 34.62; H, 3.37; N, 20.19; Cl, 34.13. Found (percent): C, 34.50; H, 3.52; N, 20.36; Cl, 34.21.

The corresponding propyl and butyl derivatives are prepared in the same manner by using the corresponding 2-propyl and 2-butyl-4,5-dichloropyridazones-3 as starting materials. In such cases, the corresponding propyl and butyl nitro containing intermediates are first formed.

EXAMPLE IV 2.08 parts of 2-ethyl-4,5-dichloro-6-amino-pyridazone-3 were dissolved in 30 parts of 80% acetic acid. To the solution was added 1 part of 98% sulfuric acid and cooled to 0° C. to —5° C. At this temperature, 16.2 parts of a nitrosyl sulfuric acid containing 0.73 part of sodium nitrite were added drop-by-drop to cause diazotization. An excess amount of the nitrous acid, which may be detected by means of a piece of potassium iodide-starch tint-paper was maintained in the solution for one hour in order to secure complete diazotization. The nitrous acid was then decomposed by the addition of a small amount of sulfamic acid.

Another solution was prepared by dissolving 1.51 parts of β-naphthol in an aqueous solution which consists of 0.42 part of caustic soda and 100 parts of water, followed by addition of 81.5 parts of 3.0% caustic solution and the whole was then cooled.

To the solution was added at the temperature ranging from 0° C. to —5° C., the preceding diazotized solution. After stirring one hour at that temperature, the pH value of the solution was brought to 5–6 by the addition of acetic acid. The reaction product which separated out was collected by filtration, washed well with water and dried at 70° C. 3.32 parts of a reddish brown dyestuff represented by the following formula were obtained.

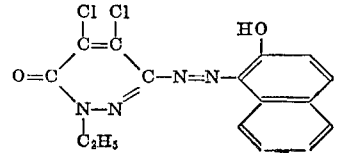

Fibrous material of nickel-containing polypropylene was dyed with a dye-bath prepared by dispersing the above-mentioned monoazo dyestuff which has been subdivided by milling with Tamol-N sold by Rohm and Haas Co. The fiber was colored a deep blue shade which was characterized by the fastness to washing, dry cleaning, sublimation, gases and light.

In similar manner, a cobalt-containing polypropylene fiber was dyed a dark greenish blue shade and a zinc-containing polypropylene fiber was dyed a brilliant blue shade. Both of these dyeings possessed remarkable fastness.

What is claimed is:

1. 2 - alkyl - 4,5 - dichloro - 6 - aminopyridazones-3 having the formula:

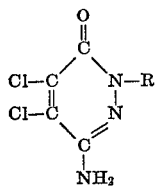

wherein R is an alkyl group of 1 to 4 carbon atoms.

2. A compound as claimed in claim 1, wherein R is methyl.

3. A compound as claimed in claim 1, wherein R is ethyl.

4. 2 - alkyl - 4,5 - dichloro - 6 - nitropyridazones-3 having the formula:

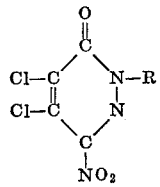

wherein R is an alkyl group of 1 to 4 carbon atoms.

5. A process for the production of 2-alkyl - 4,5 - dichloro-6-aminopyridazones-3 of the formula:

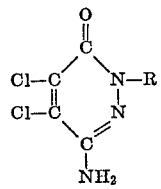

wherein R is an alkyl group of 1 to 4 carbon atoms, which comprises nitrating a 2-alkyl - 4,5 - dichloro-pyridazone-3 of the formula:

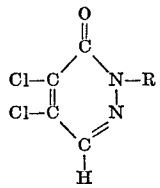

wherein R is as defined above, to form a 2-alkyl-4,5-dichloro-6-nitropyridazone-3 of the formula:

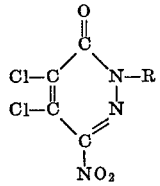

wherein R is defined as above and converting the nitro group of the latter compound to an amino group by reduction.

6. A process as claimed in claim 5, wherein R is methyl or ethyl.

7. A process as claimed in claim 5 wherein the 2-alkyl - 4,5 - dichloro-pyridazone-3 is nitrated with a mixture of concentrated sulfuric and nitric acids and the nitro group of the 2-alkyl - 4,5 - dichloro-6-nitropyridazone-3 is converted to an amino group by treatment with a metal selected from the group consisting of iron, zinc and tin together with hydrochloric acid, or with a compound selected from the group consisting of an alkali metal sulfide and an alkali metal hydrosulfite in an alkaline medium; or by catalytic reduction with hydrogen in the presence of a nickel catalyst.

References Cited
UNITED STATES PATENTS 3,317,531   5/1967   Reicheneder et al. _ 260—250 A

OTHER REFERENCES

Chemical Abstracts, vol. 65, pp. 13731–13732 (1966).

NICHOLAS S. RIZZO, Primary Examiner

U.S. Cl. X.R.

260—154